(12) United States Patent
Russo

(10) Patent No.: US 7,048,478 B2
(45) Date of Patent: May 23, 2006

(54) COMPOSABLE MACHINE TOOL

(76) Inventor: Evangelista Russo, S.S. 106 Loc. La Petrizia, I-88050 Sellia Marina (IT)

( * ) Notice: Subject to any disclaimer, the term of this patent is extended or adjusted under 35 U.S.C. 154(b) by 533 days.

(21) Appl. No.: 10/169,823

(22) PCT Filed: Jan. 17, 2001

(86) PCT No.: PCT/IT01/00021

§ 371 (c)(1),
(2), (4) Date: Nov. 13, 2002

(87) PCT Pub. No.: WO01/53036

PCT Pub. Date: Jul. 26, 2001

(65) Prior Publication Data

US 2003/0126961 A1    Jul. 10, 2003

(30) Foreign Application Priority Data

Jan. 18, 2000    (IT) .......................... CZ2000A0002

(51) Int. Cl.
*B23B 41/00*    (2006.01)
(52) U.S. Cl. .......................... 408/103; 408/135; 82/1.4
(58) Field of Classification Search ................ 408/79, 408/80, 81, 124, 130, 135, 708, 103, 108; 82/1.4, 1.5, 113
See application file for complete search history.

(56) References Cited

U.S. PATENT DOCUMENTS

| | | | | |
|---|---|---|---|---|
| 3,614,250 A | * | 10/1971 | Connolly et al. ............... | 408/3 |
| 4,050,836 A | * | 9/1977 | Anders ......................... | 408/20 |
| 4,268,196 A | | 5/1981 | Harrow | |
| 4,580,931 A | * | 4/1986 | Wilger et al. ............. | 408/72 R |
| 4,622,873 A | * | 11/1986 | Przybylski, Sr. ............. | 82/137 |
| 4,678,379 A | * | 7/1987 | Sunday ...................... | 408/83.5 |
| 4,758,121 A | | 7/1988 | Kwech | |
| 4,842,452 A | * | 6/1989 | Strait .......................... | 408/80 |
| 4,850,756 A | | 7/1989 | Dubois | |
| 4,990,037 A | | 2/1991 | Strait | |
| 5,030,041 A | * | 7/1991 | Marron ...................... | 408/83.5 |
| 5,183,365 A | * | 2/1993 | Silk ........................... | 408/80 |
| 5,954,462 A | * | 9/1999 | Way et al. .................. | 408/153 |

FOREIGN PATENT DOCUMENTS

| | | | |
|---|---|---|---|
| EP | 0 537 124 A | | 4/1993 |
| GB | 210 838 A | | 2/1924 |

* cited by examiner

OTHER PUBLICATIONS

Patent Abstracts of Japan vol. 007, No. 269 (M-259), Nov. 30, 1983 & JP 58 149111 a, Sep. 5, 1983.

*Primary Examiner*—Daniel W. Howell
(74) *Attorney, Agent, or Firm*—Michael J. Striker

(57) ABSTRACT

Composable machine tool for chip removal, on major workpieces, within wide diameter and/or great length clearance holes, made up of a shaft (1) upon which a machine base, controlled by a first engine (50) for the rotation movement and by a second engine for the translation movement, upon which are mounted the design tool elements. On the shaft (1) two support bearings (15) are mounted on both sides of the workpiece (29), all have spokes (16) each of which have radial slots (17) in which the groups (33) are inserted, regulated and locked to tighten the workpiece, on the shaft, a hydraulic jack (34) is mounted at least on one side, at the two extremities of the shaft (1), two slotted shoulders (40) are mounted to allow the jack (34) to exert the necessary pressure to lock the workpiece.

12 Claims, 5 Drawing Sheets

COMPOSABLE MACHINE TOOL

BACKGROUND OF THE INVENTION

The composable machine tool subject of the present invention is a machine for chip removal within wide diameter and great length clearance holes, made up of a shaft upon which are mounted a ring, that may shift on the shaft itself, a machine base that can rotate on the ring, two flanges that are attached to the machine base that bear the tool design elements, an engine for the rotation movement and an engine for the translation movement.

The machine described in the present invention is a composable machine, it has been studied to allow the operator to easily and precisely install it on major mechanical structures, avoiding the disassembly of the aforesaid structures, transportation with huge vehicles in specialised centres in order to repair them, thus saving time and money, advantages, these that were impossible to obtain with traditional machine tools.

The machine is studied to process workpieces with wide diameter clearance holes and to process workpieces with great length clearance holes.

Moreover, the aim of the present invention is to obtain a machine that can also be used in water.

A limit of the machines now on the market is that they are not able to process wide diameter workpieces or great length workpieces, if the said workpieces are not disassembled and transported in specialised centres with enormous traditional equipment.

In fact the chip removal machines such as lathes, drilling machines, cross cutting machines in order to work precisely need extremely rigid shafts to support without bending, the stress that the cutting tool exerts and therefore they must be very robust. If the shaft rigidity is not adequate, the stress that the machine must exert in the point in which the tool cuts influences the machine precision. Therefore the quality of the machined surfaces decreases and it is not what one expects.

There are machines on the market that can operate on the spot without disassembling the workpieces that are to be repaired, above all if these are large and are mounted on large mechanical structures. One of these machines is described in U.S. Pat. No. 4,268,196 that allows only drilling. It does not however allow precision turning or boring.

SUMMARY OF THE INVENTION

The present invention instead allows precision works on major (both diameter-wise and length-wise) workpieces, because the shaft before the machine begins to operate, is set into traction, thus reducing its flexibility. The shaft traction is determined by the fact that the workpiece is fastened between two supporting plates that hold the said shaft in traction during the entire processing period.

The backings pushed by the external slides of one or two jacks pin down through the column heads the workpieces. The internal slides of the jack in order to support the pressure exerted on them must be fastened by slotted shoulders fastened the shaft that is subject to the tensile stress equal to the pressure exerted by the jacks on the workpiece. The workpiece is firmly held, fastened by the jack pressure and contemporarily the machine tool shaft is kept in traction by a force that is equal and contrary to the pressure exerted by the jacks.

As an effect of this tensile stress the shaft of the present portable machine is more rigid than that of a traditional machine and therefore allows turning and boring with the necessary precision on workpieces with wide diameter and great length clearance holes.

The main characteristic of the present invention is to make a composable chip removal machine tool on major workpieces, within wide diameter and/or great length clearance holes, made up of a shaft upon which a machine base is mounted, controlled by a first motor for the rotation movement and by a second motor for the translation movement, upon which are mounted the tool design elements. The machine base is made up of a bush, that presents a groove that receives, like a key, the rack screwed on the shaft by allen screws, and by a rotating ring, mounted on the bush with two airtight bearings. The bush can translate on the shaft, the shaft has a tubular section, on the rotating ring are mounted, on both sides of the rotating ring, two flanges attached to the machine base that hold the tool design elements and that have a larger diameter than the rotating ring itself, tool design elements are mounted through screws on the flanges, on the shaft two support bearings are mounted on both sides of the workpiece, all have spokes each of which have radial slots, in which are inserted, regulated and locked the grippers to tighten the workpiece, on the shaft, at least on one side a hydraulic jack is mounted, at the two extremities of the shaft two slotted shoulders are mounted to allow the jack to exert the necessary pressure to lock the workpiece. In this manner, the machine shaft is set in traction between the slotted shoulders and it firmly locks with the supporting bearings the workpiece. The machine shaft, set in traction has a greater rigidity and the machine allows operating upon large diameters and/or great lengths workpieces, without the danger that the shaft may be subject to peak loads.

Another characteristic of the machine subject of the present invention is that the grippers that insert themselves in the slots to tighten the workpiece are built each by the first threaded bushes that are locked with ring nuts that are screwed on the external surface of the first threaded bushes. Both the first threaded bushes and the ring nuts have on the external rim holes to allow appropriate spanners to adequately fasten the first threaded bush and metal ring nut on the bearing. They are positioned with the axis of the hole of the first threaded bush in correspondence of the average diameter of the workpiece. Within the first threaded bush, a second threaded bush is screwed onto the external surface that is screwed within the first threaded bush. Before fastening the second bush in the first threaded bush, on the second bush a ring nut is fastened. Both the second bush and the ring nut have holes to allow the fastening with appropriate spanners. In the second bush, a column fitted with spacers placed between the column head and the second bush head. The second bush of each spoke of the supporting bearings is screwed or unscrewed until all heads do not touch the workpiece.

The gripper that fasten the workpiece allow to be moved radially along the slots, in this manner the gripper are moved into the best position in order to be pressed onto the workpiece. Eventual workpiece asymmetries are overcome by regulating each gripper differently on the slots of each single supporting bearing.

Another characteristic of the machine subject of the present invention is that the engines are hydraulic engines driven by a hydraulic power unit connected to them through tubes. Hydraulic engines allow the use of the machine in water. The machine tools present on the market are driven by electric engines that do not allow, unless they are given heavy and expensive water resistant casings, their underwater use because of the obvious danger of using electrical current underwater. The possibility, therefore, to operate underwater on workpieces with wide diameter and great length clearance holes, presents insurmountable difficulties for other machines. The present machine because of its hydraulic engines does not present the inconveniences of the other portable machines tools and, furthermore, it has the necessary shaft rigidity to carry out the operations with due precision.

Another characteristic of the machine subject of the present invention is that the toothed rack is mounted through alien screws on the shaft, the toothed rack protrudes from the shaft diameter and is grafted on as a key connects the shaft to the ring and to the supporting bearing hub. The toothed rack itself is used as a key, thus simplifying the construction.

Another characteristic of the machine subject of the present invention is that rotating ring is mounted on the bush through airtight bearings.

Another characteristic of the machine subject of the present invention is that the motors are contained in a casing, in order to avoid that the chip may end up in the engines, damaging them.

Another characteristic of the machine subject of the present invention is that the motor for translation movement drives a worm gear that moves a gear wheel that meshes with the toothed rack. The translation movement is a continuous movement with no jerks, to avoid acceleration that may turn into dangerous stress on the tools and generally on the machine.

Another characteristic of the machine subject of the present invention is that the tubes are wound and unwound in a hose reel as the machine base draws nearer and as it moves away. To avoid that the tubes obstruct processing, they are collected and unwound according to requirements.

Another characteristic of the machine subject of the present invention is that slotted shoulder is fastened by a bolt that is screwed on the threaded hole present on the shaft and on the pivot. The slotted shoulder is, therefore easily, with only one bolt, fastened on the shaft and on the pivot.

Another characteristic of the machine subject of the present invention is that the slotted shoulder is extracted by a bolt that is screwed in the threaded hole present on the slotted shoulder itself, that having a larger diameter than the threaded hole, pushes externally the slotted shoulder itself. Just as easily the slotted shoulder is extracted, unscrewing the clamp bolt and inserting the apposite bolt for the greater diameter extraction of the threaded hole present on the shaft and on the pivot.

Another characteristic of the machine subject of the present invention is that on the two flanges two plates that have a larger diameter than the two flanges endowed with holes upon which the tool design elements are screwed. With the interchangeable plates, it is possible with a greater diameter, to operate on larger workpieces.

Another characteristic of the machine subject of the present invention is that the space between the bush and rotating ring forms the lubricant tank of the machine base. The bush has a lubricant hole for the bush itself, for the shaft, for the rack, for the rotating ring. The lubricant is prevented from spilling by the seals. To improve the machine yield, it is also lubricated.

Other invention characteristics and advantages will appear clearly from the description hereafter of certain realisation ways given as an unrestricted example in FIGS. 1, 2, 3, 4, 5, 6, 7, 8 and 9.

DESCRIPTION OF THE PREFERRED EMBODIMENTS

Figure 1:
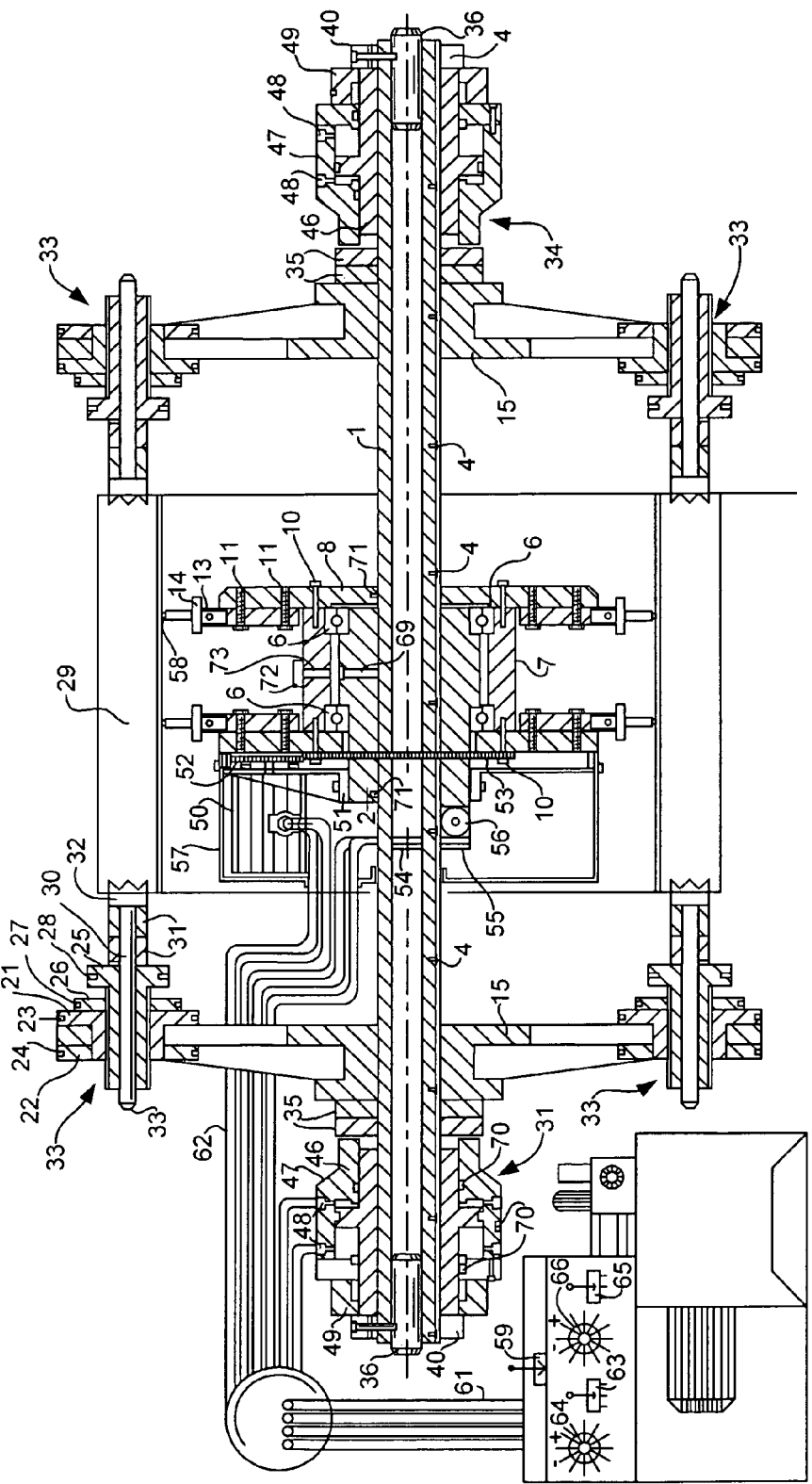
FIG. 1 represents a section of the machine tool subject of the present invention.

In FIG. 1, a machine base made up of a bush 2 and of a rotating ring 7 is mounted on a tubular sectioned shaft 1. To improve corrosion resistance the shaft surface is chromium plated. On shaft 1 a toothed rack 3 is mounted, which is inserted in the groove made in shaft 1 and that is fastened to it through a series of alien screws 4. The toothed rack 3 serves also as a key for bush 2, because in bush 2 a groove 5 is made that receives the rack key 3. To improve corrosion resistance and its duration, bush 2 is bronzed.

Because rack 3 is working in groove 5, it does not allow the relative rotation between shaft 1 and the bush 2. It is instead possible to have translation movement relative to the sense of the longitudinal direction of shaft 1 between the shaft 1 itself and bush 2.

Two bearings 6 that support a rotating ring 7 are mounted on bush 2. The bearings 6 are airtight and are fastened by a flange 8 and by a flange 9. The space between the bush 2 and the rotating ring 7 creates the lubricant tank of the machine base. The bush 2 has a hole 69 for the lubrication of the bush 2 itself, of shaft 1, of rack 3, of the rotating ring 7. The lubricant cannot fall out because of the seals 71.

The two 8 and 9 flanges are mounted on one side and the other of the rotating ring 7 through bolts 10, which make it integral with the rotating ring. The two flanges 8 and 9 have a greater diameter that the rotating ring 7. The flanges 8 and 9 in the part that comes out from the rotating ring 7 have a series of holes, which allows through bolts 11 to mount tool design elements 12. Flanges 8 and 9 also accomplish the task of locking the bearings 6 in the housing of the rotating ring 7.

Figure 9:
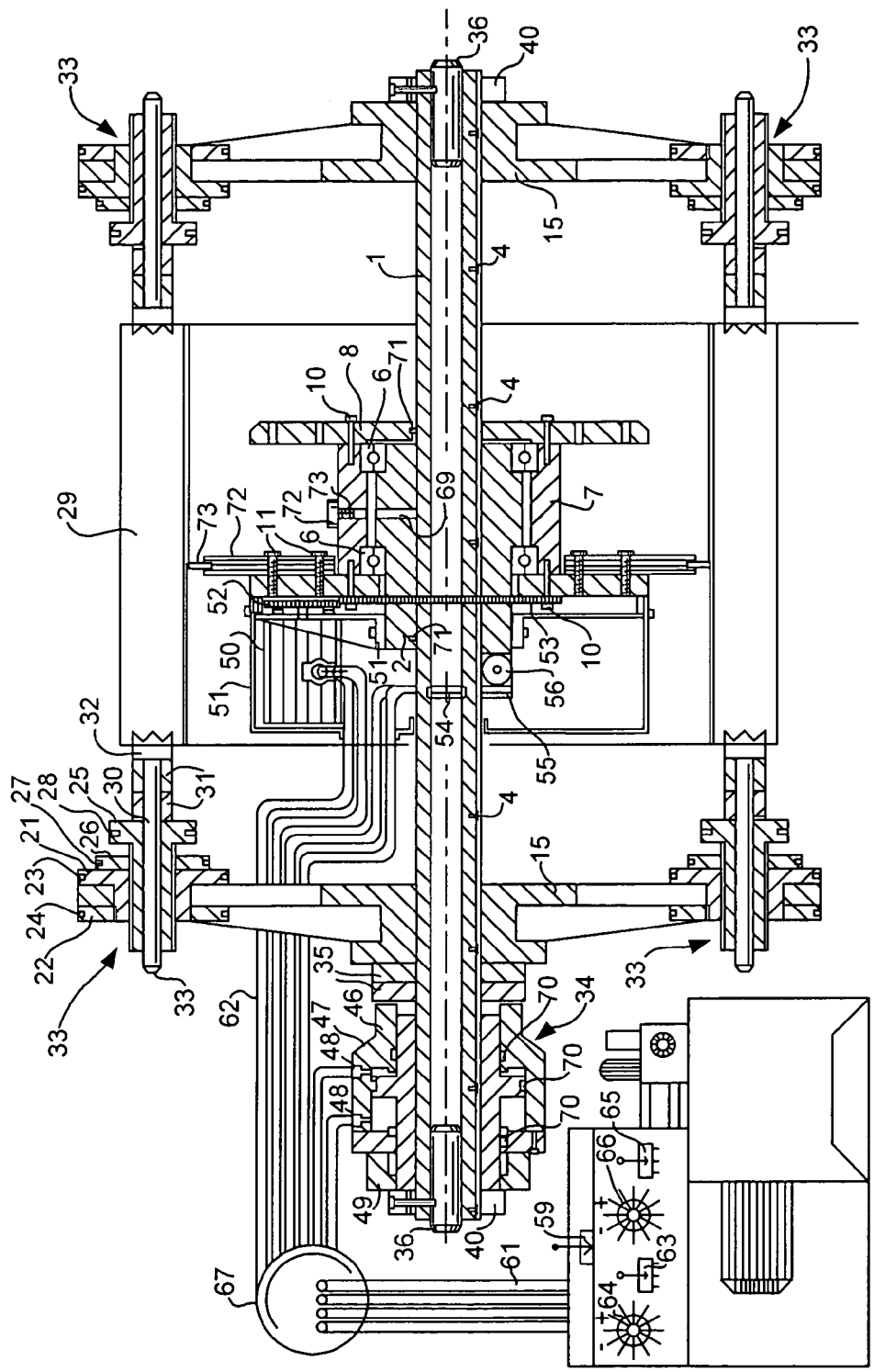
FIG. 9 represents a section of the machine tool subject of the present invention, which mounts the processing tools.

Flanges 8 and 9 are used both to fasten the centring elements of the machine on workpiece 29 and to fasten the elements 72 that bear the cutting tools 73 (see FIG. 9).

On flanges 8 and 9 are mounted some tool design heads (12) that carry threaded pivots 13 endowed with ring nuts 14 that allow though their movement to centre the machine within workpiece 29.

The ring nuts 14 are manoeuvred until the centres 58 do not touch the internal surface of workpiece 29, centring shaft 1 on workpiece 29.

Figure 3:
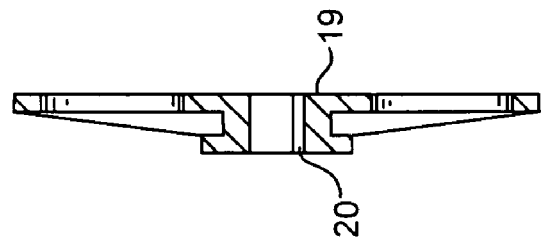
FIG. 3 represents a section of a supporting bearing
Figure 2:
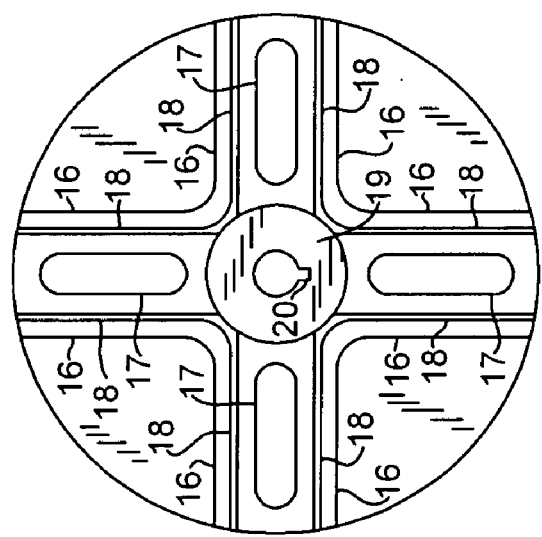
FIG. 2 represents a view of a supporting bearing.

After the centring, the supporting bearings 15 are inserted on both sides of shaft 1 (see also FIGS. 2 and 3).

The supporting bearings 15 have spokes 16, each of which has radial slots 17, and stiffening flanges 18. On each hub 19 of each supporting bearing 15 are made grooves 20 that receive the rack key 3. In this manner the supporting bearings 15 can shift on the shaft but not rotate.

In each slot 17 grippers 33 are inserted to fasten the workpiece. The grippers 33 in order to fasten the piece can be regulated according to the diameter of workpiece 29 and once they are regulated in the correct position, they are locked. The grippers to fasten the piece are made up of the first threaded bushes 21 that are locked with the rings 22 that are screwed on the external surface of the first threaded bushes 21. Both the first threaded bushes 21 and the rings 22 are endowed on the external rim of respectively holes 23 and 24 to allow with opportune spanners to adequately tighten the first threaded bush 21 and the ring 22 on bearing 15. They are positioned with the axis of the hole of the first threaded bush 21 in correspondence of the average diameter of workpiece 29.

Within the first threaded bush 21 is screwed a second bush 25 threaded on its external surface that is screwed within the first threaded bush 21.

Before screwing the second bush 25 in the first threaded bush 21, a ring 26 is screwed on the second bush 25. Both the second bush 25 and the ring 26 are respectively endowed with holes 27 and 28 to allow clamping with opportune spanners. In the second bush 25, the column 30 is introduced endowed with spacers 31 set between the head 32 of the column 30 and the head of the second bush 2. The second bush 25 of each spoke 16 of the supporting bearings 15 is screwed or unscrewed until all the heads 32 do not touch the workpiece 29. Jacks 34 mounted on the extremities of shaft 1 are used to lock the workpiece.

Before inserting the jacks 34, on one extremity or another of the shaft 1, the spacers 35 are inserted.

Shaft 1 at its two extremities has two solid pivots 36 that are inserted with force in shaft 1 itself to strengthen it.

Figure 6:
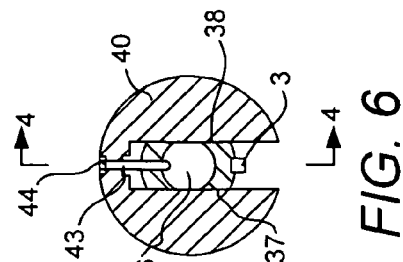
FIG. 6 represents a different section of the final part of the clamping system.
Figure 7:
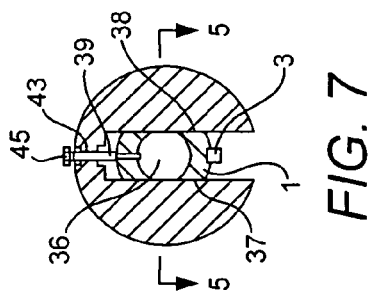
FIG. 7 represents a section of the clamping ring during the disassembly.
Figure 4:
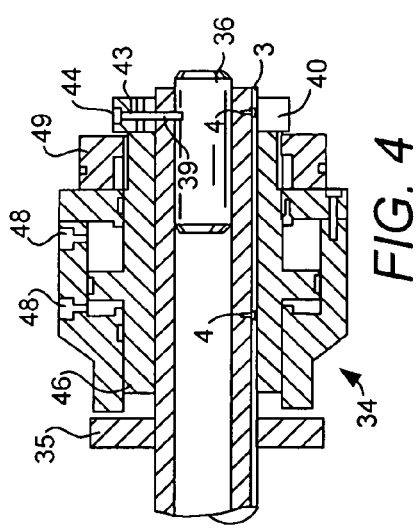
FIG. 4 represents a section of the final part of the clamping system.
Figure 5:
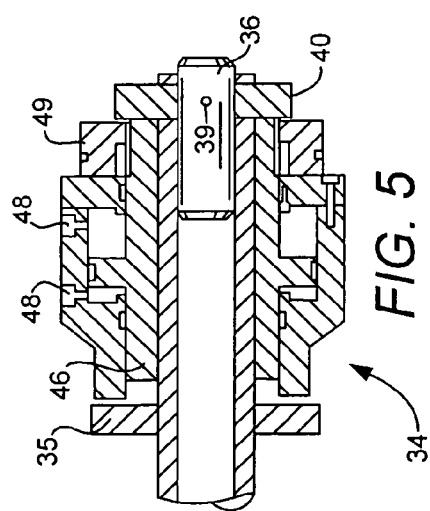
FIG. 5 represents a section of the clamping ring during the assembly.

Shaft 1 at its extremities (see FIGS. 6 and 7) has on both sides the cuttings 37 and 38 that arrive until the solid pivot 36.

The cuttings 37 and 38 are symmetrical in relation to the toothed rack 3.

On the opposite part of the toothed rack 3, on the shaft 1 a threaded hole 39 is realised (see FIGS. 4, 5, 6 and 7).

The jacks 34 are opposed on one side by the supporting bearings 15, through the spacers 35, and on the other, at the extremity, by the slotted shoulders 40, for the jack thrust seal, that have two arms 41 and 42 with an opening that is equal to the distance between the cuttings 37 and 38 made on shaft 1 and on the solid pivots 36. The slotted shoulder 40 has a threaded hole 43 whose diameter is greater than the threaded hole 39 that is on shaft 1. The slotted shoulder 40 in order to be fastened on shaft 1 is tightened with a bolt 44 that is screwed into the threaded hole 39 that is on shaft 1.

To extract the slotted shoulder 40 the bolt 44 is unscrewed and bolt 45 is inserted that perfectly screws into threaded hole 43 of the clamping hole 40 and that therefore has a greater diameter than the threaded hole 39. For that reason, the bolt 45, when it is screwed into the threaded hole 43, arrives to the threaded hole 39, but, it having a larger diameter than the aforesaid threaded hole 39, can not penetrate in it and it will push Shaft 1, compelling it to move upwards the slotted shoulder 40.

The jacks 34 are composed of an internal slide 46 and an external slide 47. The hydraulic fluid introduced under pressure through the 48 holes pushes the internal slide 46 against the slotted shoulder 40 and it forces the external slide 47 to push through the spacers 35 the supporting bearings 15 that in turn through the columns 30 fasten the workpiece 29. The packings 70 guarantee the hydraulic seal of the jacks. To improve head 32 gripping on the columns 32, one drives the back of the column with a mallet to make the head 32 penetrate and grip better, it is fitted with claw clamps and hardened to increase and improve the grasp on the workpiece 29.

For particular applications the claw clamped and hardened heads 32 may have the form that follows the shape of the workpiece 29. They are substitutable and, in some case heads 32 can be used to weld on the workpiece that 29, these heads are disposable, single use.

Essentially workpiece 29 is fastened between the supporting bearings driven by the jacks 34 and, therefore, shaft 1 is set into traction between the aforementioned bearings. For safety the external slides 47 that fasten through hydraulic pressure workpiece 29 are mechanically locked and definitively through the ring nuts 49 that are screwed on both sides of the internal slides 46. Once workpiece 29 is mechanically fastened, the hydraulic pressure that is exerted on the jacks 34 can be eliminated.

The hydraulic engine 50 supported by a stirrup 51 is mounted on the bush 2. The hydraulic engine 50 is stably connected with a gear wheel 52 that meshes with a gear wheel 53 fastened with screws 10 to the machine base 7. The hydraulic engine 50 allows the rotation movement.

On bush 2 is mounted, on a bearing such as engine 50, a second hydraulic engine 54 that with a worm gear 55 drives a gear wheel 56 that meshes with the toothed rack 3. The hydraulic engine 54 allows the translation movement.

The engines 50 and 54 are closed by casing 57, in sheet metal or plastic to avoid that the excess chip damages the engines.

Through a hydraulic power unit 60 it is possible to send pressurised fluid to the hydraulic engines 50 and 54 and to the jacks 34.

The power unit 60 is started through a hydraulic deflector 59. The pressurised fluid through tubes 61 and 62 is sent to engines 50 and 54 and to jacks 34.

Through lever 63 the rotation of engine 50 is activated and it transmits the rotation movement to machine base 7 in one direction pushing lever 63 right and in the opposite direction pushing it left.

The rotation speed is regulated through a fluxmeter controlled by knob 64. Through lever 65 engine 54 is started, that through the worm gear 55 and 56 determines the translation movement in one direction pushing the lever 65 right and in the opposite direction pushing it left, the translation speed is instead regulated through a fluxmeter controlled by knob 66.

To avoid that the tubes 62 that supply the rotation engine 50 and the translation engine 54 get entangled, they are wound and unwound in a hose reel 67 that winds the tubes 62 when the machine base draws nearer and unwinds the tubes 62 when they move away.

Figure 8:
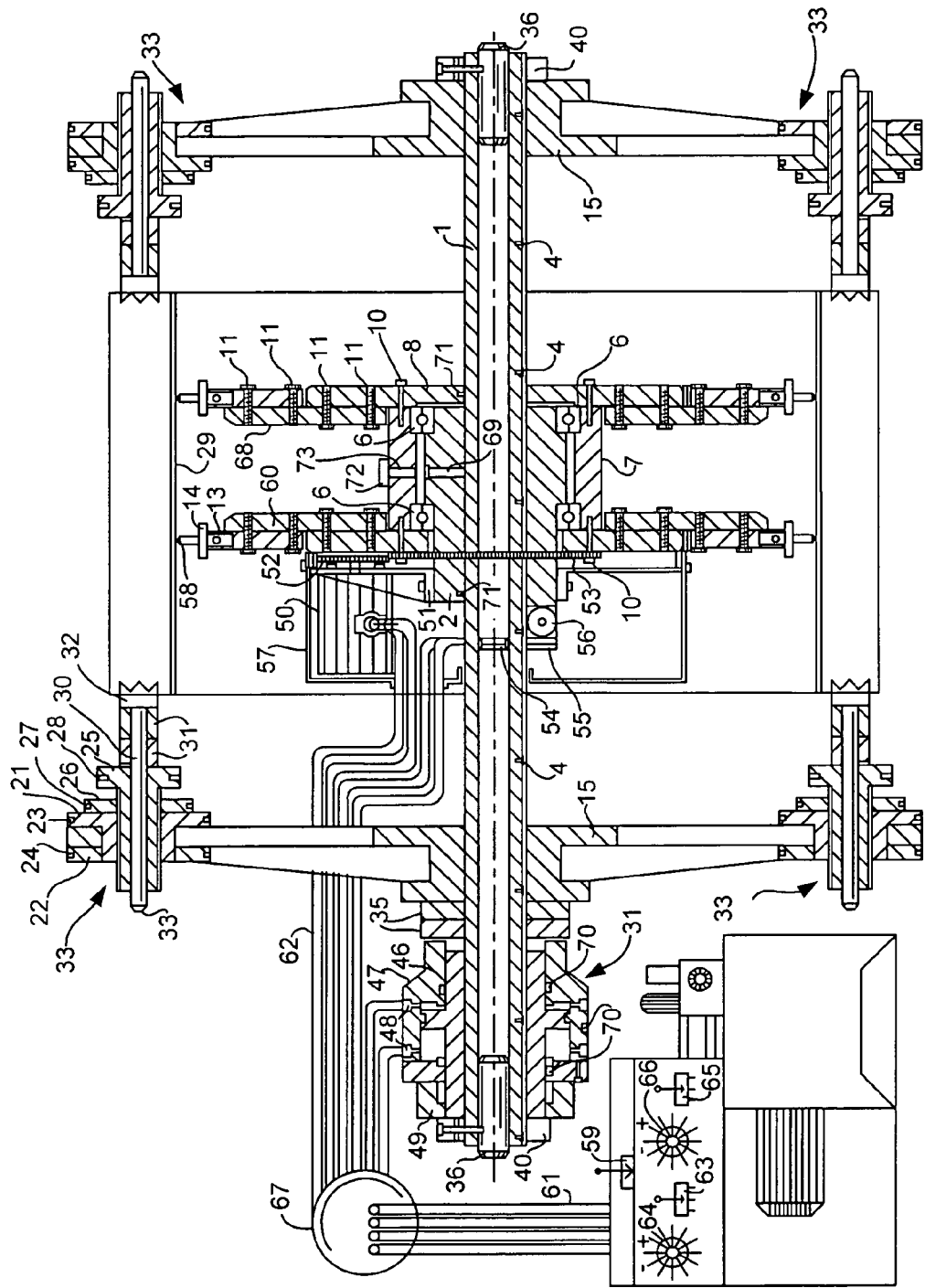
FIG. 8 represents a section of the machine tool subject of the present invention of only one jack.

Referring to FIG. 8 on shaft 1 only one jack 34 is mounted that pushes the workpiece 29 through the columns 30 and the supporting bearings 15 against the slotted shoulder 40 positioned opposite the shaft and on its extremity. Shaft 1 will be therefore set in traction between the slotted shoulder 40 and the jack 34. For safety, even now the external slide 47 is mechanically locked through ring nut 49 that is screwed on the internal slide 46. Even in this case, once workpiece 29 is mechanically fastened, the hydraulic pressure that is exerted on jack 34 can be eliminated.

The space between the bush 2 and the rotating ring 7 forms the lubricant tank of the machine base. The bush 2 has a clearance hole 69 for lubrication of the bush 2 itself, of the shaft 1, of the rack 3, of the rotating ring 7. The lubricant is prevented from spilling by the seals 71. The lubricant is poured through the plug 73 arranged on the rotating ring 7, it goes through the clearance hole 74 reaches the space between the bush 2 and the rotating ring 7 that forms the tank of the lubricant itself.

Plates 68 are mounted on flanges 8 and 9 to allow processing of larger diameter pieces. The plates have a greater diameter than the two flanges 8 and 9 and on these plates 68 the tool design elements 13 are screwed.

The invention, it must be understood, is not limited to the representation given by the tables but may receive improvements and changes from the man of the art without going beyond the invention area.

The present invention allows numerous advantages and overcomes difficulties that could not have been won with the systems today in commerce.

The invention claimed is:

1. A composable machine tool for chip removal of major workpieces within wide diameter and/or great length clearance holes, comprising a shaft; a machine base mounted on said shaft; a first engine providing a rotation movement; and second engine provided a translation movement, said machine base being composed of a bush that has a groove receiving a rack fastened on said shaft by alien screws, and by a rotating ring mounted on said bush, so that said bush is shiftable on said shaft, said shaft being tubular sectioned; two flanges mounted on said rotating ring on both sides and being integral with said rotating ring that carry tool design elements or tool heads and have a greater diameter than said rotating ring, said tool design elements or said tool heads being mounted on said flanges through screws; two supporting bearings mounted on said shaft on both sides of a workpiece and having spokes each of which have radial slots; grippers inserted in said radial slots, regulated and locked to fasten the workpiece; a hydraulic jack mounted on said shaft at least on one side; and two slotted shoulders mounted on extremities of said shaft to allow said hydraulic jack to exert a necessary pressure to lock the workpiece.

2. A composable machine tool as defined in claim 1, wherein said grippers inserted in said slots to fasten the workpiece are each composed of first threaded bushes that are locked with ring nuts that are screwed on an external surface of said first threaded bushes, said first threaded bushes and said ring nuts having on an external rim holes to allow with opportune spanners adequate fastening of said first threaded bush and said ring nut on a respective one of said supporting bearings, and axis of a clearance hole of said first threaded bush being positioned in correspondence with an average diameter of the workpiece; a second bush screwed within said first threaded bush and threaded on an external surface that is screwed within said first threaded bush, so that before screwing said second bush into said first Threaded bush, on said second bush a nut ring is screwed, both said second bush and said ring nut being respectively provided with holes to allow clamping by the opportune spanners; a column introduced into said second bush and provided with spacers set between a head of said column and a head of said second bush, said second bush of each of said spokes of said supporting bearings being screwed or unscrewed until all said head of said column do not touch the workpiece.

3. A composable machine tool as defined in claim 1, wherein said engines are hydraulic engines which are driven by a hydraulic power unit connected to said engines through tubes.

4. A composable machine tool as defined in claim 1, wherein said toothed rack protrudes from a diameter of said shaft and is grafted on in said bush as a key and in a hub of said supporting bearing.

5. A composable machine tool as defined in claim 1, wherein said rotating ring is mounted in said bush through airtight bearings.

6. A composable machine tool as defined in claim 1, and further comprising a casing in which said engines are contained.

7. A composable machine tool as defined in claim 1, wherein said second engine drives a worm gear that moves a gear wheel that meshes with said toothed rack.

8. A composable machine tool as defined in claim 1, and further comprising tubes that are wound and unwound in a hose reel when said machine base draws in opposite directions correspondingly.

9. A composable machine tool as defined in claim 1, wherein a respective one of said slotted shoulders is fastened by a bolt that is screwed on a threaded hole provided in said shaft and on a pivot.

10. A composable machine tool as defined in claim 1, wherein a respective one of said slotted shoulders is extracted by a bolt that is screwed in a threaded hole provided on said slotted shoulder, having a larger diameter than said threaded hole, and pushes externally said slotted shoulder.

11. A composable machine tool as defined in claim 1, and further comprising two plates that are mounted on said flanges and have a larger diameter than said flanges and provided with holes upon which tool design elements are screwed.

12. A composable machine tool as defined in claim 1, wherein said bush and said rotating ring are arranged so that a space is formed therebetween and forms a lubricant tank of said machine base, said bush having a lubricant hole for said bush, for said shaft, for said rack, and for said rotating ring; and further comprising seals provided for preventing spilling of a lubricant.

* * * * *